United States Patent [19]

Williams

[11] Patent Number: 5,764,852
[45] Date of Patent: Jun. 9, 1998

[54] METHOD AND APPARATUS FOR SPEECH RECOGNITION FOR DISTINGUISHING NON-SPEECH AUDIO INPUT EVENTS FROM SPEECH AUDIO INPUT EVENTS

[75] Inventor: Marvin L. Williams, Bedford, Tex.

[73] Assignee: International Business Machines Corporation, Armonk, N.Y.

[21] Appl. No.: 291,372

[22] Filed: Aug. 16, 1994

[51] Int. Cl.$^6$ ..................................... G10L 3/02
[52] U.S. Cl. .................. 395/2.52; 395/2.1; 395/2.4; 395/2.42; 395/2.35; 395/2.36; 395/2.37; 395/2.6
[58] Field of Search .................. 395/2, 2.4, 2.42, 395/2.35, 2.36, 2.37, 2.52, 2.6, 2.64, 2.79, 2.8, 2.81, 2.84, 41, 43, 46, 47

[56] References Cited

U.S. PATENT DOCUMENTS

| | | | |
|---|---|---|---|
| 4,383,135 | 5/1983 | Scott et al. | 395/2.52 |
| 4,532,648 | 7/1985 | Noso et al. | 395/2.84 |
| 4,797,924 | 1/1989 | Schnars et al. | 395/2.84 |
| 4,827,520 | 5/1989 | Zeinstra | 395/2.84 |
| 4,918,735 | 4/1990 | Morito et al. | 395/2.42 |
| 5,209,695 | 5/1993 | Rothschild | 395/2.84 |
| 5,231,691 | 7/1993 | Yasuda | 395/2 |
| 5,274,739 | 12/1993 | Woodard | 395/2.42 |
| 5,369,728 | 11/1994 | Kosaka et al. | 395/2.42 |

OTHER PUBLICATIONS

Schmandt, Ackerman, and Hindus, "Augmenting a Window System with Speech Input," Computer, 23(8):50–56, Aug. 1990.

*Primary Examiner*—Allen R. MacDonald
*Assistant Examiner*—Alphonso A. Collins
*Attorney, Agent, or Firm*—Edward H. Duffield; Andrew J. Dillon

[57] ABSTRACT

A method and apparatus for analyzing audio input events. A template is utilized to analyze audio input events. A speech audio input event is identified. The identified speech audio input event is recorded. The recorded speech audio input event is processed to create a first entry in a template. A selected non-speech audio input event which occurs in a selected environment is identified. The identified non-speech audio input event is recorded. Then the recorded non-speech audio input event is processed to create a second entry in the template. Thereafter, a speech audio input event and a non-speech audio input event is distinguished by comparing an audio input event to the template.

8 Claims, 7 Drawing Sheets

METHOD AND APPARATUS FOR SPEECH RECOGNITION FOR DISTINGUISHING NON-SPEECH AUDIO INPUT EVENTS FROM SPEECH AUDIO INPUT EVENTS

BACKGROUND OF THE INVENTION

1. Technical Field

The present invention relates in general to the field of speech recognition and in particular to the field of recognition of unknown phrases. Still more particularly, the present invention relates to a method and apparatus for speech recognition, which takes into account background noises.

2. Description of the Related Art

Speech analysis and speech recognition algorithms, machines, and devices are becoming more and more common. Such systems have become increasingly powerful and less expensive. Within recent years, an explosion in the use of voice recognition systems has occurred. These systems allow a user on a data processing system to employ voice activated commands to direct various programs and applications. One goal of voice recognition systems is to provide a more humanistic interface for operating a data processing system. Voice recognition systems, typically, are used with other input devices, such as a mouse, keyboard, or printer. These input devices often are used to supplement the input/output ("I/O") processes of voice recognition systems. Various known voice recognition systems, typically, contain a set, i.e., a template, of recognizable phrases from which the user can speak to use voice activated commands. At any instance in time, the voice recognition system's memory contains a recognizable set. This recognizable set contains a set of digitized audio phrases from which to choose a recognizable phrase. For example, if 64 trained phrases are within the voice recognition system's memory, the detected sounds, background or intentional, are compared to this recognizable set. Thus, an unintentional background noise may create a confidence factor that may be interpreted as a recognizable phrase within the set.

Typically, the monitoring of an audio environment, causes the voice recognition system to detect background noises. These background noises are often interpreted as user recognizable inputs. Such a situation can cause a problem, involving the voice recognition system performing operations or commands because of background noise. Attempts have been made to solve this problem through the use of calibration techniques. Such a method essentially involves using the voice recognition system to initially monitor a background noise sample. The sample functions as an aggregated factor when the voice recognition system is actually listening for recognizable phrases. These calibration techniques are often inefficient and often assume the sample of background noise detected during the calibration phrase is identical or similar to the background noise that will exist during the actual recognition phase.

Other approaches have allowed the user to manually disable the recognition mode of the voice recognition system. Such an approach, however, requires manual enabling and disabling of the recognition mode when the user suspects that the background noise will interfere with the operation of the voice recognition system. This technique often requires the user to remember which mode the voice recognition system is operating within. Moreover, it can be extremely cumbersome to enable and disable the voice recognition system. Often the causes of these background noises are induced by the user. Peripheral devices, such as keyboard sounds and printer sounds, are an example of background noise often initiated by the user. These noises can interfere with the operation of the voice recognition system, i.e., causing the system to recognize background noises as phrases corresponding to a command or function.

The problem of inadvertently selecting a background noise as a recognizable phrase is due to the background noise closely mimicking a phrase within the recognizable set that is within the voice recognition system's memory. Therefore, it would be advantageous to have a method and apparatus by which the operation of peripheral devices that produce background noise can be recognized as background noise during the recognition mode of the voice recognition system.

SUMMARY OF THE INVENTION

It is one object of the present invention to provide an improved method and apparatus for speech recognition.

It is another object of the present invention to provide an improved method and apparatus for recognition of unknown phrases.

It is yet another object of the present invention to provide an improved method and apparatus for speech recognition, which takes into account background noises.

The present invention provides method and apparatus for analyzing audio input events. The present invention utilizes a template to analyze audio input events. A speech audio input event is identified. The identified speech audio input event is recorded. The recorded speech audio input event is processed to create a first entry in a template. A selected non-speech audio input event which occurs in a selected environment is identified. The identified non-speech audio input event is recorded. Then the recorded non-speech audio input event is processed to create a second entry in the template. Thereafter, a speech audio input event and a non-speech audio input event is distinguished from each other by comparing an audio input event to the template, wherein the non-speech audio input event is identified.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
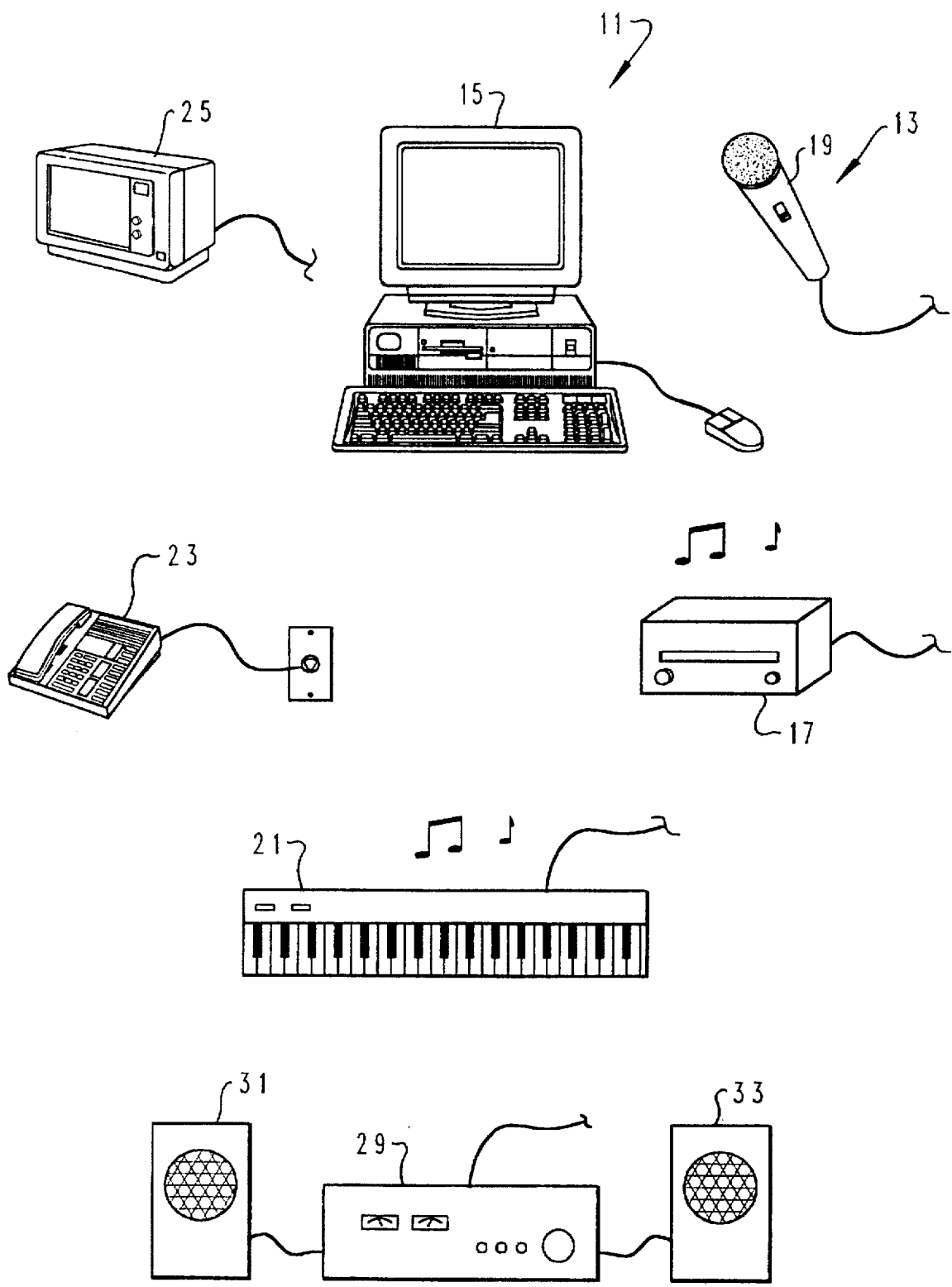
FIG. 1 is a multimedia data processing system in accordance with a preferred embodiment of the present invention.

With reference now to the figures and in particular with reference to FIG. 1, there is depicted multimedia data processing system 11 which includes a plurality of multimedia end devices 13 which are electrically connected to computer 15. Those skilled in the art, will, upon reference to the specification, appreciate that computer 15 may comprise any personal computer system well known in the prior art, such as the PS2 IBM Computer manufactured by International Business Machines Corporation of Armonk, N. Y. The plurality of multimedia end devices 13 include all types of multimedia end devices which either produce or consume real-time and/or asynchronous streamed data, and include without limitation such end and video monitor 25. Each of these multimedia end devices 13 may be called by multimedia application software to produce or consume the streamed data.

For example, the operation of CD-ROM player 17 may be controlled by multimedia application software which is resident in, and executed by, computer 15. The real-time digital data stream generated as an output of CD-ROM player 17 may be received and processed by computer 15 in accordance with instructions of the multimedia application resident therein. For example, the real-time digital data stream may be compressed for storage on a conventional computer floppy disk or for transmission via modem over ordinary telephone lines for receipt by a remotely located computer system which may decompress and play the digital streamed data on analog audio equipment. Alternatively, the real-time data stream output from CD-ROM player 17 may be received by computer 15, and subjected to digital or analog filtering, amplification, and sound balancing before being directed, in analog signal form, to analog stereo amplifier 29 for output on audio speakers 31 and 33.

Microphone 19 may be used to receive analog input signals corresponding to ambient sounds. The real-time analog data stream may be directed to computer 15, converted into digital form, and subject to manipulation by the multimedia application software, such as a voice recognition program. The digital data may be stored, compressed, encrypted, filtered, subjected to transforms, outputted in analog form to analog stereo amplifier 29, directed as an output in analog form to telephone 23, presented in digitized analog form as an output of a modem for transmission on telephone lines, transformed into visual images for display on video monitor 25, or subjected to a variety of other different and conventional multimedia digital signal processing operations.

In a similar fashion, the analog and digital inputs and outputs of keyboard 21, telephone 23, and video monitor 25 may be subjected to conventional multimedia operations in computer 15. In particular, computer 15 may be used as a voice recognition system to direct commands and functions for other applications executing on computer 15. Microphone 19 may be used to receive speech audio input events, i.e., human speech, the audio input events may be processed using a multimedia application that is directed towards recognizing speech from analyzing inputs from microphone 19.

Figure 2:
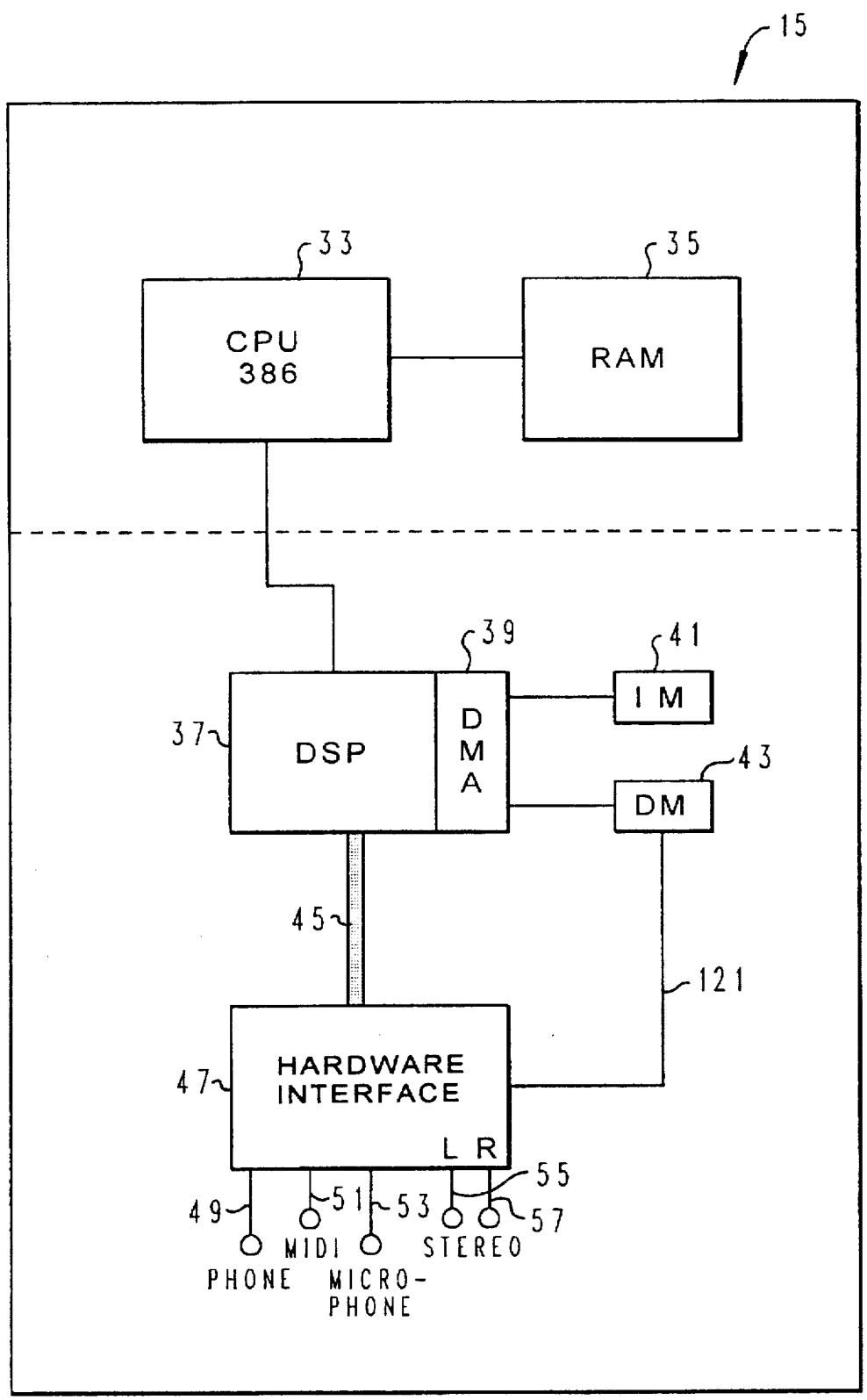
FIG. 2 depicts a block diagram representation of the principal hardware components utilized to execute applications, such as a voice recognition system in accordance with a preferred embodiment of the present invention.

FIG. 2 is a block diagram representation of the principal hardware components which are utilized in the present invention to execute multimedia applications which control the operation of multimedia end devices 13. As is conventional in multimedia data processing operations, a central processing unit (CPU) 33 is provided in computer 15. Typically, the multimedia application software, such as a voice recognition application, is resident in RAM computer memory 35. CPU 33 executes the instructions which comprise the multimedia application. Also, as is typical in multimedia data processing operations, digital signal processor 37 is provided as an auxiliary processor, which is dedicated to performing operations on the real-time and/or asynchronous streamed data. As is well known to those skilled in the art, digital signal processors are microprocessor devices which are dedicated to performing operations based upon, or which include, real-time data and are thus designed to be very fast and respond quickly to allow the real-time operational nature of the multimedia end devices. Typically, in order to speed-up the operation of the digital signal processor 37, a conventional direct memory access (DMA) 39 is provided to allow for the rapid fetching and storing of data. In the present invention, separate instruction memory (IM) 41 and data memory (DM) 43 are provided to further speed up the operation of digital signal processor 37. Bus 45 is provided to communicate data between digital signal processor 37 and hardware interface 47, which includes digital-to-analog and analog-to-digital converters. Inputs and outputs for the various multimedia end devices 13 are connected through the digital-to-analog (D/A) and analog-to-digital (A/D) converter 47. In FIG. 2, a telephone input/output 49, a microphone input 53, and stereo outputs 55, 57 are depicted, in an exemplary manner, and are connected through the A/D and D/A converters in hardware interface 47. MIDI input/output also is connected to hardware interface 47 to digital signal processor 37 but is not connected to A/D or D/A converters.

Figure 3:
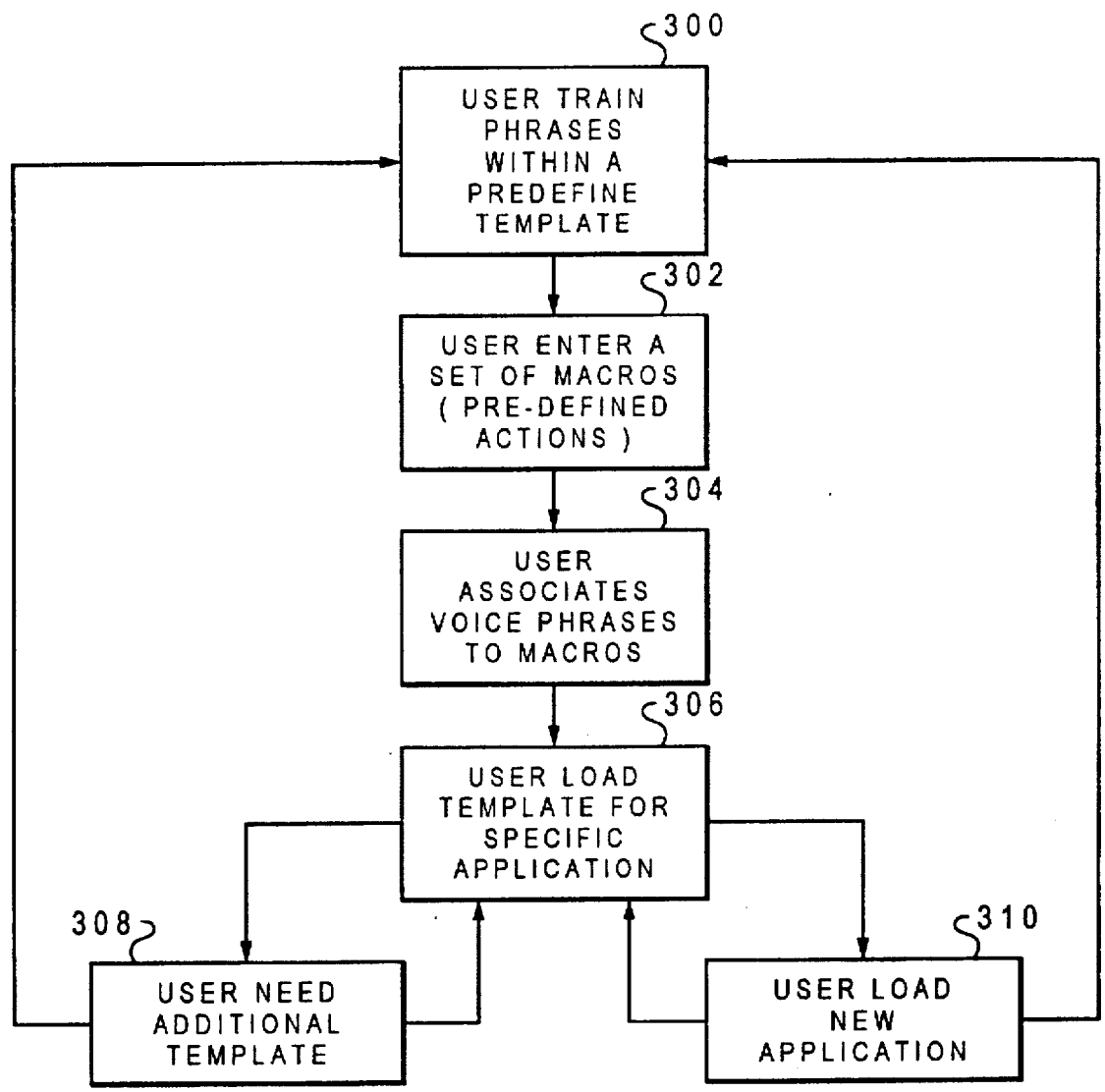
FIG. 3 is a high level flow chart of a process employed by a user to train an application to recognize voice recognition commands in accordance with a preferred embodiment of the present invention.

Referring next to FIG. 3, a high level flow chart of a process employed by a user to train an application to recognize voice recognition commands is depicted in accordance with a preferred embodiment of the present invention. The user must "train" a set, i.e., a template of phrases for recognition, as illustrated in block 300. The user also defines a set of actions in the form of macros setting forth predefined actions, as depicted in block 302 in accordance with a preferred embodiment of the present invention. The user then correlates or associates particular phrases to the actions, as illustrated in block 304. In other words, the user associates a voice phrase or ideal input event to a macro. The user then loads a template for a particular application, as depicted in block 306. Typically during this phase of the process, the voice recognition system may encounter background noise. This noise may match an entry within the template, i.e., meet a confidence factor of an entry within the set of phrases.

Also, the recognizable set within the template may not perform all commands desired by the user for a particular application. For example, the desired voice recognition template may not be currently within the voice recognition system's memory. In such cases, the user may issue a voice command to swap templates from the memory. This occurs when the user requires an additional template, as illustrated in block 308. In another situation, the user may require a new set of templates to be loaded when the user loads a new application, as depicted in block 310.

The present invention employs a method and apparatus that allows a voice recognition system to automatically register background noises produced by peripheral devices.

The present invention also may automatically enable and disable the voice recognition mode based on interrupts from the peripheral devices. The present invention involves a method and apparatus by which the background interrupt noise is not disregarded, but dynamically added to the set of recognizable phrases. The registration of a null command accompanies the background noise phrase in accordance with a preferred embodiment of the present invention.

Alternatively, a command may be associated with the background noise phrase. For example, the command may disable the voice recognition system until some other event occurs. This approach allows for a dynamic training of the voice recognition system for background noise. The system may be trained to recognize different background noises, which decreases the probability that a background noise will be mistaken for a recognizable phrase within the set, i.e., the recognizable set now includes a confidence factor for the background noise.

Figure 4:
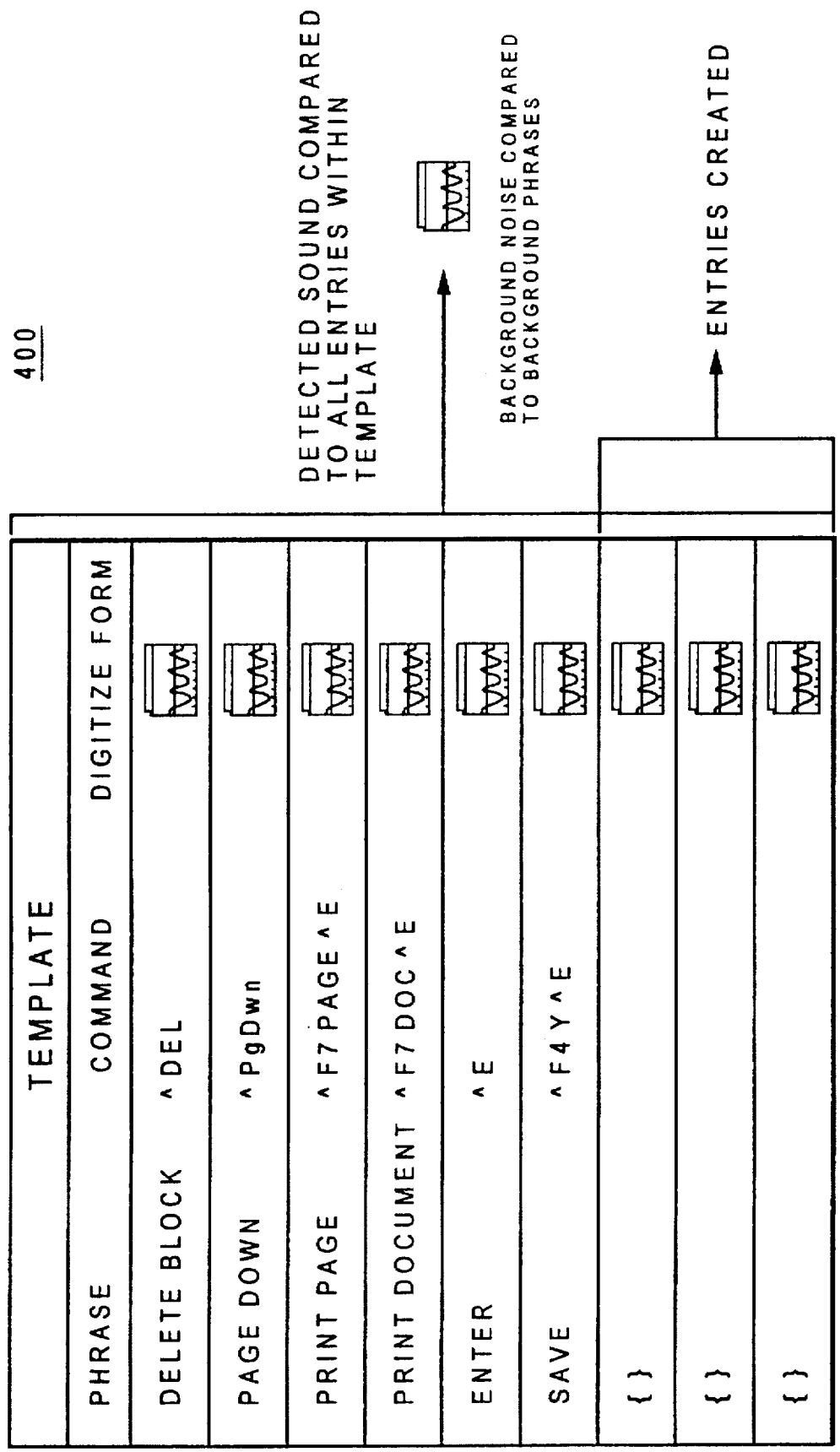
FIG. 4 depicts a template illustrated in accordance with a preferred embodiment of the present invention.

Referring now to FIG. 4, a template 400 is illustrated in accordance with a preferred embodiment of the present invention. The PHRASE column identifies the textural representation of recognizable phrases. The COMMAND column identifies the command, e.g., keyboard macro that will be executed upon the voice recognition system recognizing the audio phrase. For example, upon the voice recognition system, recognizing the phrase "PRINT DOCUMENT", the function key F7 will be sent to the keyboard buffer, followed by the word DOC, followed by the ENTER key (^E) entering the keyboard buffer. As a result, the application will receive the F7 DOC ENTER keystrokes upon the voice recognition system recognizing the phrase "PRINT DOCUMENT". These would be the commands necessary for an application to print a document. The DIGITIZED FORM column shows a graphical representation of an audio sample for each phrase within the template. The representations are for purposes of illustration only and represent an average of how the user speaks the particular phrase, i.e., trained sample phrases.

A comparison of the digitized sound form to the digitized forms trained by the user within the template is performed by the voice recognition system detecting a sound or audio input event. Upon detecting background noises as defined by the interrupt criteria dynamically introduces sound phrases into the template. The symbol { } designate entries for phrases produced by the invention as can be seen in the PHRASE column in FIG. 4.

In accordance with a preferred embodiment of the present invention, an association of a null command to the entry for a created phrase may be made. The voice recognition system, upon detecting an audio input event, background or human voice, compares the sound to all entries within the template. A background sound also is referred to a "non-speech audio input event" and a human voice sound also is referred to as a "speech audio input event". A higher confidence factor exists for a comparison of a background noise to a background noise sample because the voice recognition system compares audio input events to a recognizable set of entries within the template.

Figure 5:
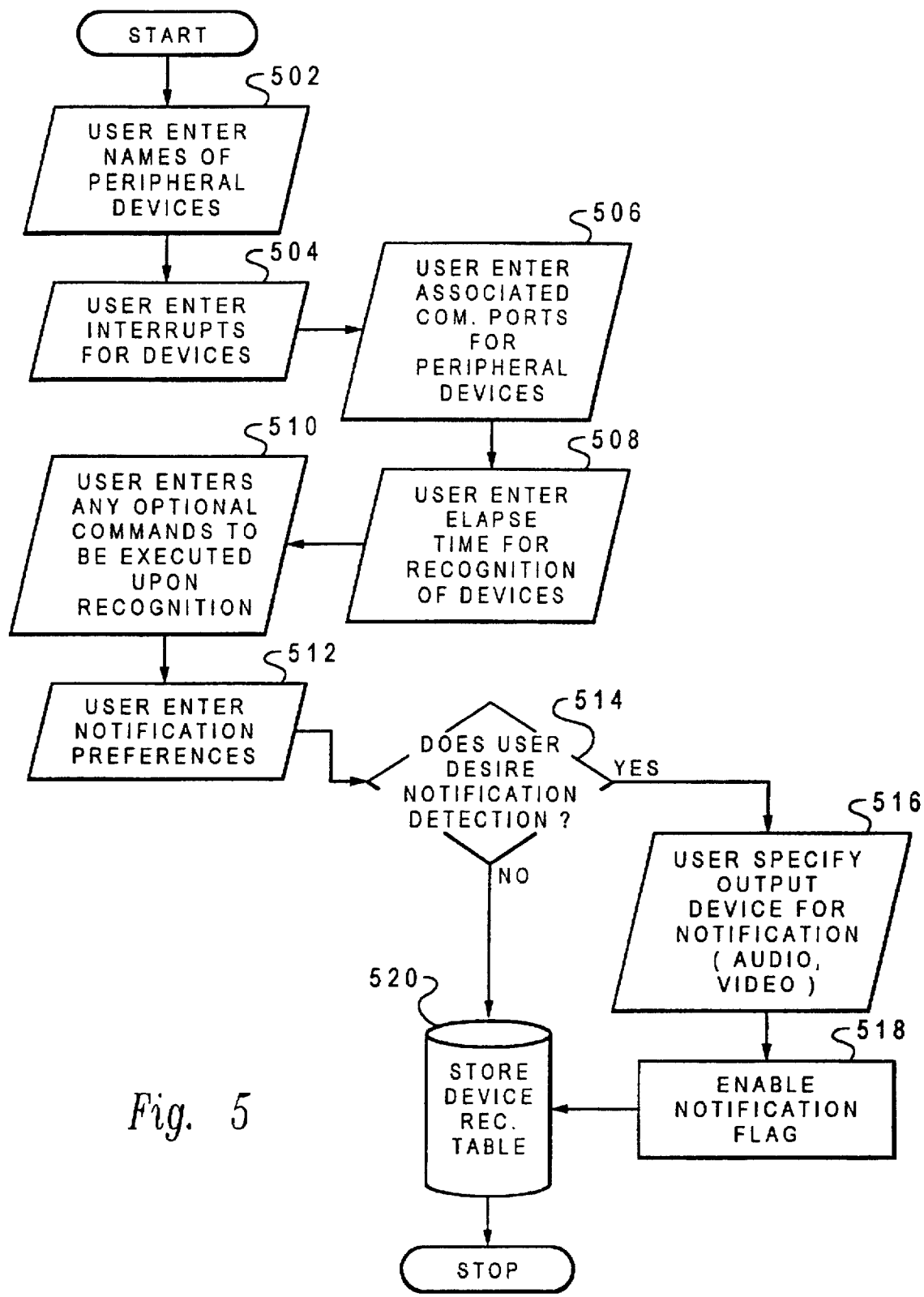
FIG. 5 is a flow chart of a process for registering peripheral devices that can create noise or background sounds in accordance with a preferred embodiment of the present invention.

Referring now to FIG. 5, a flow chart of a process for registering peripheral devices that can create noise or background sounds (non-speech audio input events) is depicted in accordance with a preferred embodiment of the present invention. The process begins by receiving user input in the form of names for the peripheral devices, as illustrated in block 502. The process then receives user input identifying interrupts for each of the peripheral devices, as depicted in block 504. Thereafter, user input is received by the process, designating associated communications ports for the peripheral devices, as illustrated in block 506. The process then receives user input as to the elapsed time for the recognition of devices, as depicted in block 508.

Next, user input identifying any optional commands to be executed upon recognition are received, as illustrated in block 510. The process then receives user input as to the notification preferences, as depicted in block 512. A user may choose to be notified when an appropriate recognition is made. The process then determines whether the user desires to be notified during detection of noise from peripheral devices, as illustrated in block 514. If the user desires notification, the process then receives user input specifying the output device for notification, as depicted in block 516. The user may be notified via various output devices, such as a speaker for audio notification or a video monitor for video notification. The process then enables the notification flag, as illustrated in block 518.

Thereafter, the process terminates after storing the information entered by the user in a device recognition table, as depicted in block 520. Referring back to block 514, if the user does not desire notification, the process also proceeds to block 520. A device recognition table may take various forms, such as a file continuing field or a relational data base.

Figure 6:
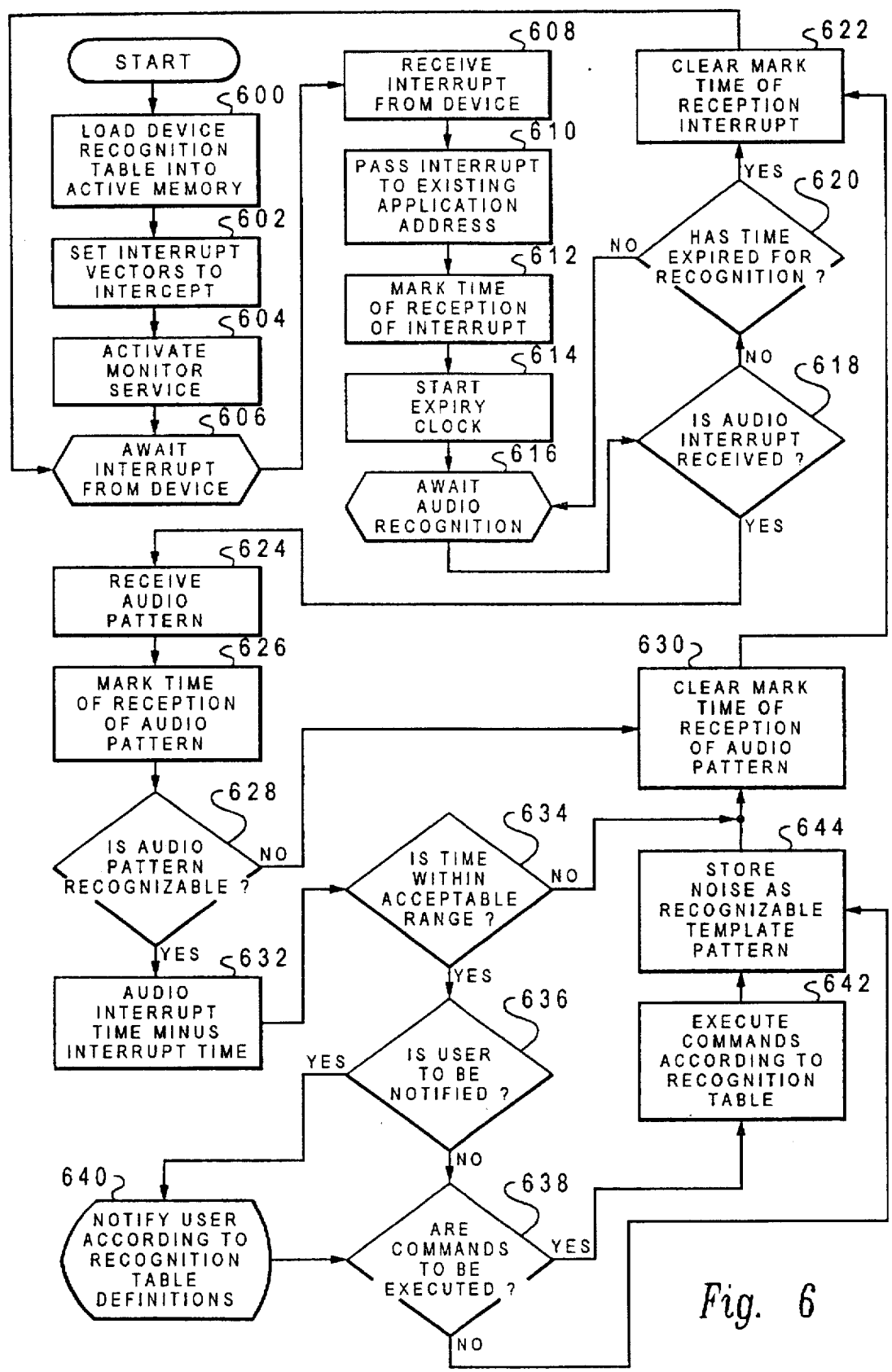
FIG. 6 depicts a flow chart of a process for training and updating a voice recognition system to detect and differentiate between sounds that are speech audio input events or non-speech audio input event.

Referring now to FIG. 6, a flow chart of a process for training and updating a voice recognition system to detect and differentiate between sounds (also called "audio input events") that are speech audio input events or non-speech audio input events. The process begins by loading a device recognition table into active memory, as illustrated in block 600. The device recognition table is the data entered by the user and stored as illustrated in FIG. 5. The process then sets the interrupt vectors to intercept interrupts from the peripheral devices designated in the device recognition table before they reach the target application, as illustrated in block 602. The process then activates a monitoring service, as depicted in block 604. A monitoring service used to monitor for interrupts is well known to those of ordinary skill in the art and various methods may be employed in accordance with a preferred embodiment of the present invention.

The process then awaits an interrupt from a peripheral device, as illustrated in block 606. The process then receives an interrupt from the peripheral device, as depicted in block 608. Next, the process passes the interrupt to an existing application address to finally deliver to the interrupt to the target application, as illustrated in block 610. The process next marks the time of the reception of the interrupt, as depicted in block 612. Next, the process starts an expiry clock, as illustrated in block 614. An expiry clock is basically a timer that is employed in a preferred embodiment of the present invention to determine how much time has passed since the detection of an interrupt.

The process then awaits an audio recognition, as depicted in block 616. In other words, the process waits to see if a recognizable pattern, a pattern that meets a confidence threshold for an entry in the template, is detected. Upon the recognition of audio, the process then determines whether an audio interrupt has been received, as illustrated in block 618. An audio interrupt occurs when an input device, such as a microphone, detects an audio input event. If an audio interrupt has not been received, the process then determines whether the time has expired for recognition, as depicted in block 620, if time has expired for recognition, the process then clears the mark for the time that the interrupt is received, as illustrated in block 622, with the process then returning to block 606 to await an interrupt from a peripheral device. Referring again to block 620, if time has not expired for recognition, the process then returns to block 616 to await an audio recognition.

Referring again to block 618, if an audio interrupt is received, the process then proceeds to receive the audio pattern (the audio input event), as depicted in block 624. The process marks the time of reception of the audio pattern, as illustrated in block 626. Thereafter, the process determines whether the audio pattern is recognizable, as depicted in block 628. If the audio pattern is not recognizable, the process then proceeds to clear the mark for the time of reception of the audio pattern as illustrated in block 630. Thereafter, the process proceeds to block 622 as described above.

Referring again to block 628, if the audio pattern is recognizable, the process then subtracts the interrupt time for the peripheral device from the audio interrupt time to determine an elapsed period of time, as depicted in block 632. The process next determines whether the time period calculated is within an acceptable range, as depicted in block 634. If the time period is not within an acceptable range, the process proceeds to block 630 as described previously. On the other hand, if the period of time is within the acceptable range, the process then determines whether the user is to be notified of the recognition of the non-speech audio input event, as depicted in block 636. If the user is to be notified, the process then determines whether commands are to be executed, as illustrated in block 638.

Figure 7:
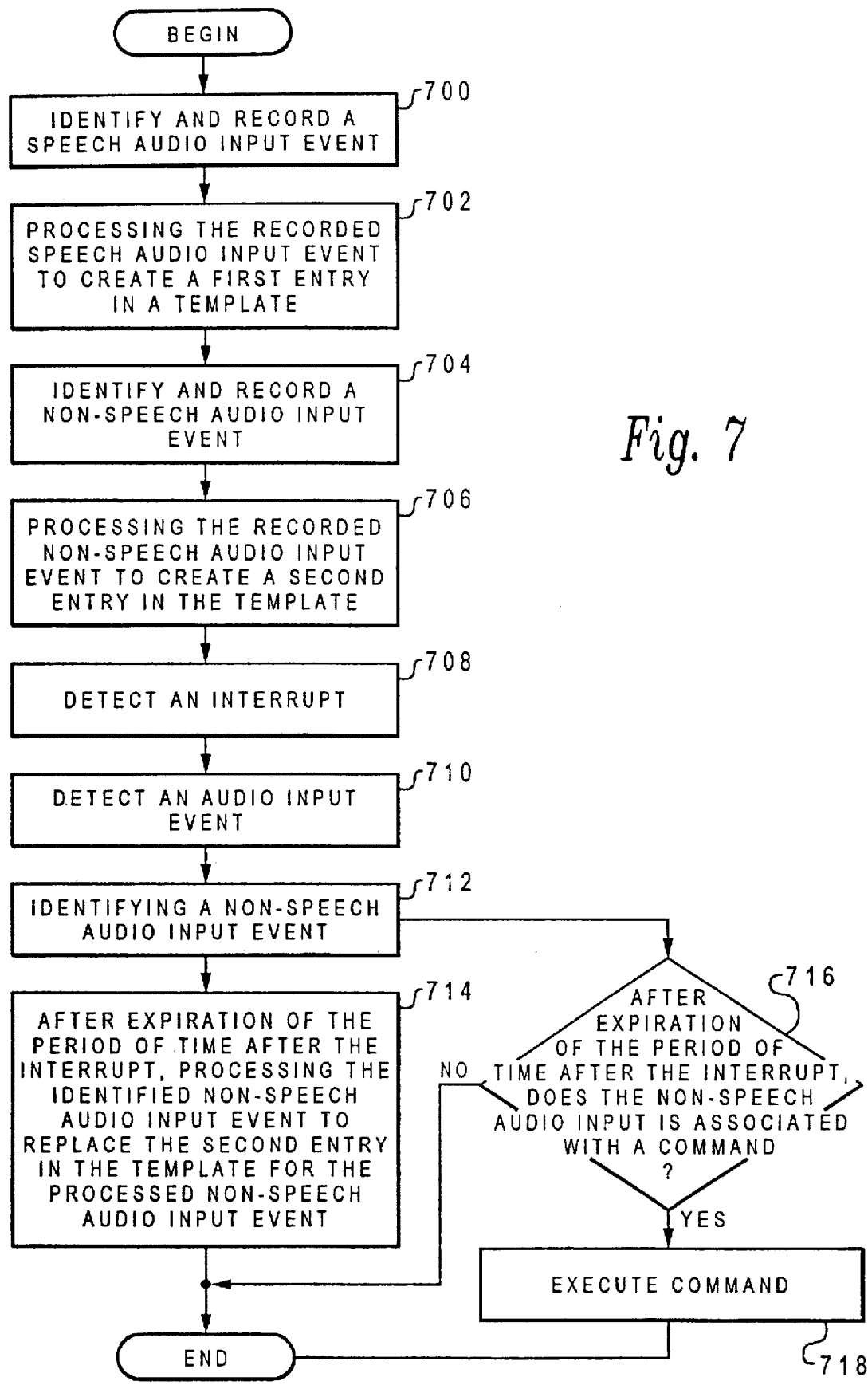
FIG. 7 is a flowchart of a process for analyzing audio input events in a data processing system in accordance with a preferred embodiment of the present invention.

Referring back to block 636, if the user is to be notified, the process then proceeds to notify the user according the recognition table definitions, as illustrated in block 640. Thereafter, the process also determines whether commands are to be executed, as depicted in block 638. If commands are to be executed, the process then executes the commands according to the recognition table, as depicted in block 642. Thereafter, the noise (non-speech audio input event) is stored as a recognizable template pattern, as illustrated in block 644. In other words, the non-speech audio input event is stored as an entry in the template. Thereafter, the process proceeds to block 630 as previously described. Referring again to block 638, if commands are not to be executed, the process proceeds directly to block 644. With reference now to FIG. 7, a flowchart of a process for analyzing audio input events in a data processing system is depicted in accordance with a preferred embodiment of the present invention. The process begins by identifying and recording a speech audio input event, as depicted in block 700. Next, the recorded speech audio input event is processed to create a first entry in a template, as illustrated in block 702. The process then identifies and records a non-speech audio input event, as depicted in block 704. The recorded non-speech audio input event is then processed to create a second entry in the template, as illustrated in block 706. Next, the process detects an interrupt, as depicted in block 708. Then, an audio input event is detected after the detection of an interrupt, as illustrated in block 710. The process then identifies a non-speech audio input event by comparing the detected audio input event with the template, as depicted in block 712.

After the expiration of a period of time after the interrupt, the identified non-speech audio input event is processed to replace the second entry in the template for the processed non-speech audio input event, as illustrated in block 714. Additionally, in response to identifying a non-speech audio input event, a determination is made after the expiration of a period of time after the interrupt occurs as to whether a command is associated with the non-speech audio input event, as depicted in block 716. If a command is associated with the non-speech audio input event, the command is executed, as illustrated in block 718 with the process terminating thereafter. With reference again to block 716, if a command is not associated with the non-speech audio input event, the process also terminates. Blocks 714 and 710 both occur in response to an identification of a non-speech audio input event.

In accordance with a preferred embodiment of the present invention, the process depicted in FIG. 6 is implemented as a terminate and stay resident ("TSR") service that intercepts the interrupts registered by the user or some other entity, such as the administrator of the application. Interrupts from the peripheral devices are immediately sent to their associated interrupt vector table addresses, i.e., the interrupt transferred to the appropriate device. This ensures that the keyboard interrupt service receives the keyboard interrupt and the printer services receive their output. The detectable voice recognition phrases which meet no confidence factor within the template, but are received within the designated time of an interrupt are candidates of null associates in accordance with a preferred embodiment of the present invention. Each peripheral device has an associated interrupt defined for it. For example, a personal computer may use interrupt 14H for a keyboard interrupt.

The present invention may be directed to intercept hardware interrupts or interrupts of the operating system. The registration service illustrated in FIG. 5 allows a user to specify the interrupts upon which recording should be activated for an audio input event. The user may adjust the sensitivity at which an interrupt should be interpreted as background noise or a non-speech audio input event. Predefined defaults may be set for existing devices, e.g., printers normally operate on interrupt 5H.

In accordance with a preferred embodiment of the present invention, a pre-process may be employed to evaluate if the audio input event detected should be compared to an existing null phrase or to create a new phrase. Such a process may involve the continuous employment of background noise to train the system for a particular noise phrase. In addition, null commands may be substituted for user supplied or system default commands. For example, the commands could issue a SAVE command for a word processor. With an increase in noise activity, such as interference, the user may desire to save the work presently completed. In such a situation, one of the background sounds matches an executable phrase.

The user also may be graphically notified when null associations are created. Such a notification also can be made through audio means. Moreover, the user may be allowed to modify null commands upon notification of creation.

The present invention also may allow for entire template switching based upon the type of interrupt received, rather than a null association. Such an option would signify that the interrupt detected may be a preeminent signal to a new application that employs a different set of voice recognition phrases, requiring a new set of templates.

In accordance with a preferred embodiment of the present invention, the fundamental problem of voice recognition systems involving differentiation of non-speech audio input events from speech audio input events is addressed. The present invention recognizes that peripheral devices may produce background noise and that a system may be allowed to essentially execute commands that are irrelevant to the applications in response to this background noise. The present invention provides a method and apparatus for allowing peripheral devices to affix digitized sound phrases within voice recognition sets, such as templates. The present invention provides further advantage over prior art methods in that the present invention does not need to always be activated. Once, a background noise is "trained" and registered into the template, the invention may be disabled or removed. This provides an advantage of freeing computer resources for other applications.

While the invention has been particularly shown and described with reference to a preferred embodiment, it will be understood by those skilled in the art that various changes in form and detail may be made therein without departing from the spirit and scope of the invention.

I claim:

1. A method for analyzing audio input events in a data processing system, wherein said data processing system utilizes a template to analyze audio input events, wherein said data processing system includes a peripheral device that generates said audio input event and an interrupt, said method comprising the steps of:
    identifying a speech audio input event;
    recording said identified speech audio input event;
    processing said recorded speech audio input event to create a first entry in a template;
    identifying a selected non-speech audio input event which occurs in a selected environment;
    recording said identified non-speech audio input event;
    processing said recorded non-speech audio input event to create a second entry in said template; and
    thereafter, distinguishing between a speech audio input event and a non-speech audio input event by comparing said audio input event to said template in response to detecting said interrupt and detecting said audio input event within a preselected amount of time wherein said non-speech audio input event is identified.

2. The method of claim 1, further comprising:
    determining whether a command is associated with said non-speech audio input event in response to identification said non-speech audio input event; and
    responsive to said command being associated with said non-speech audio input event, executing said command.

3. A method for analyzing audio input events in a data processing system, wherein said data processing system utilizes a template to analyze audio input events and wherein said data processing system includes a peripheral device that generates an audio input event and an interrupt, said method comprising the steps of:
    identifying a speech audio input event;
    recording said identified speech audio input event;
    processing said recorded speech audio input event to create a first entry in a template;
    identifying a selected non-speech audio input event which occurs in a selected environment;
    recording said identified non-speech audio input event;
    processing said recorded non-speech audio input event to create a second entry in said template for said processed non-speech audio input event;
    detecting an interrupt;
    detecting said audio input event, wherein said audio input event occurs after said interrupt;
    identifying a non-speech audio input event by comparing an audio input event to said template;
    responsive to identifying a non-speech audio input event occurring a preselected amount of time after said interrupt occurs, determining whether a command is associated with said non-speech audio input event; and
    executing said command in response to said command being associated with said non-speech audio input event.

4. The method of claim 3 further comprising processing said identified non-speech audio input event occurring said preselected amount of time after said interrupt occurs to replace said second entry in said template for said processed non-speech audio input event.

5. An apparatus for analyzing audio input events, wherein said utilizes a template to analyze audio input events, wherein apparatus includes a peripheral device that generates an audio input event and an interrupt, said apparatus comprising:
    first identification means for identifying a speech audio input event;
    first recording means for recording said identified speech audio input event;
    first processing means for processing said recorded speech audio input event to create a first entry in a template;
    second identification means for identifying a selected non-speech audio input event which occurs in a selected environment;
    second recording means for recording said identified non-speech audio input event;
    second processing means for processing said recorded non-speech audio input event to create a second entry in said template for said processed non-speech audio input event; and
    comparison means for distinguishing between a speech audio input event and a non-speech audio input event by comparing said audio input event to said template in response to detecting said interrupt and detecting said audio input event within a preselected amount of time, wherein said non-speech audio input events may be efficiently distinguished from speech audio input events.

6. The apparatus of claim 5, further comprising:
    means for determining whether a command is associated with said non-speech audio input event in response to identification of said non-speech audio input event; and
    responsive to said command being associated with said non-speech audio input event, means for executing said command.

7. An apparatus method for analyzing audio input events, where said apparatus utilizes a template to analyze audio input events and wherein said data processing system includes a peripheral device that generates an audio input event and an interrupt, said apparatus comprising:
    first identification means for identifying a speech audio input event;
    first recording means for recording said identified speech audio input event;
    first processing means for processing said recorded speech audio input event to create a first entry in a template;
    second identification means for identifying a selected non-speech audio input event which occurs in a selected environment;
    second recording means for recording said identified non-speech audio input event;

second processing means for processing said recorded non-speech audio input event to create a second entry in said template for said processed non-speech audio input event;

first detection means for detecting an interrupt;

second detection means for detecting said audio input event, wherein said audio input event occurs after said interrupt;

third identification means for identifying a non-speech audio input event by comparing an audio input event to said template;

determination means, responsive to identifying a non-speech audio input event occurring a preselected amount of time after said interrupt occurs, for determining whether a command is associated with said non-speech audio input event; and execution means for executing said command in response to said command being associated with said non-speech audio input event.

8. The apparatus of claim 7 further comprising means for processing said identified non-speech audio input event occurring said preselected amount of time after said interrupt occurs to replace said second entry in said template for said processed non-speech audio input event.

* * * * *